United States Patent
Bhagwan et al.

(10) Patent No.: US 8,505,823 B2
(45) Date of Patent: Aug. 13, 2013

(54) NOISE REMOVAL FROM COLOR BARCODE IMAGES

(75) Inventors: Varun Bhagwan, San Jose, CA (US); Timothy Liu, Alhambra, CA (US); Justin Ormont, Beaver Dam, WI (US); Heather Underwood, Boulder, CO (US)

(73) Assignee: International Business Machine Corporation, Armonk, NY (US)

( * ) Notice: Subject to any disclaimer, the term of this patent is extended or adjusted under 35 U.S.C. 154(b) by 519 days.

(21) Appl. No.: 12/828,051

(22) Filed: Jun. 30, 2010

(65) Prior Publication Data

US 2012/0000983 A1    Jan. 5, 2012

(51) Int. Cl.
*G06K 7/00* (2006.01)

(52) U.S. Cl.
USPC .................................... 235/462.04; 235/469

(58) Field of Classification Search
USPC ............................................ 235/462.04, 469
See application file for complete search history.

(56) References Cited

U.S. PATENT DOCUMENTS

| | | | |
|---|---|---|---|
| 6,375,075 B1 * | 4/2002 | Ackley et al. | 235/462.04 |
| 6,981,644 B2 * | 1/2006 | Cheong et al. | 235/462.04 |
| 7,207,492 B2 | 4/2007 | Lucera et al. | |
| 7,213,762 B2 | 5/2007 | Zhu et al. | |
| 7,350,711 B2 | 4/2008 | He et al. | |
| 7,359,564 B2 | 4/2008 | Keam et al. | |
| 8,100,330 B2 * | 1/2012 | Bulan et al. | 235/462.04 |
| 2005/0011956 A1 | 1/2005 | Carlson | |
| 2006/0072158 A1 | 4/2006 | Christie | |
| 2009/0114727 A1 | 5/2009 | Heinrich et al. | |
| 2009/0141997 A1 | 6/2009 | Lee et al. | |

FOREIGN PATENT DOCUMENTS

WO    2007064897 A1    6/2007

* cited by examiner

*Primary Examiner* — Christle Marshall
(74) *Attorney, Agent, or Firm* — Steven L. Nichols; Van Cott, Bagley, Cornwall & McCarthy P.C.

(57) ABSTRACT

A method for noise removal from color barcode images includes acquiring a barcode image using a color imaging array and separating the barcode image into color channels. Weighting factors are associated with the color channels and at least one weighting factor is reduced. The weighting factors are applied to the color channels to produce a first transformed image. A portion of the first transformed image is analyzed to produce a first set of decoded data from the barcode.

20 Claims, 7 Drawing Sheets

| Combinations | | Binary Image Color Channel Weighting | | |
| --- | --- | --- | --- | --- |
| | | Blue | Red | Green |
| | A | 1 | 1 | 1 |
| | B | 1 | 1 | 0 |
| | C | 1 | 0 | 1 |
| | D | 0 | 1 | 1 |
| | E | 1 | 0 | 0 |
| | F | 0 | 1 | 0 |
| | G | 0 | 0 | 1 |
| | H | 0 | 0 | 0 |

NOISE REMOVAL FROM COLOR BARCODE IMAGES

BACKGROUND

A barcode is an optical machine-readable representation of data which is used for product and service identification, for inventory tracking, or to provide other information. Typical barcodes are linear or two dimensional images which are printed on a contrasting background. In the past, dedicated barcode readers were used to scan and decode the barcodes. As general purpose color cameras, particularly in mobile devices, become less expensive and more widely available, it can be both efficient and convenient to use these color cameras to image barcodes. The color imaging data can then be processed to decode the barcode. However, the color imaging sensors in the general purpose cameras are not specifically adapted to barcode imaging. For example, the general purpose cameras may not be stable, in focus, or provide ideal lighting. Additionally, some portions of the data generated by the general purpose color cameras may generate a significant amount of noise to the image but contribute very little useful information for decoding the barcode.

BRIEF SUMMARY

A method for noise removal from color barcode images includes acquiring a barcode image using a color imaging array and separating the barcode image into color channels. Weighting factors are associated with the color channels and at least one weighting factor is reduced. The weighting factors are applied to the color channels to produce a first transformed image. A portion of the first transformed image is analyzed to produce a first set of decoded data from the barcode.

A system for noise removal in barcode images includes a color imaging camera having a color imaging array and image processing software. The image processing software acquires a barcode image from the color imaging array and reduces the contribution of at least one color channel in the barcode image to form a transformed barcode image. Then at least one color channel has a lower contrast between a background and a barcode than other color channels in the barcode image.

A computer program product for noise removal from color barcode images includes a computer readable storage medium having a computer readable program code embodied therewith. The computer readable program code acquires a barcode image using a color imaging array, separates the barcode image into color channels, associates weighting factors with the color channels, reduces at least one weighting factor, applies the weighting factors to the color channels to produce a first transformed image, and analyzes a portion of the transformed image to produce a first set of decoded data from the barcode.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods for noise removal from barcode images produced by color image sensors. By removing noise from the color barcode images, the barcode can be more quickly and accurately recognized. According to one illustrative embodiment, noise can be removed from a color barcode image by discarding one or more of the color channels produced by the camera. Additionally or alternatively, the various color channels can be weighted to produce data which has less noise and can be more accurately decoded than the original image. Methods for selecting a desirable weighting for the color channels can include techniques based on various characteristics of the color channel data and/or adaptive/predictive models which anticipate which weightings may produce more acceptable results.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
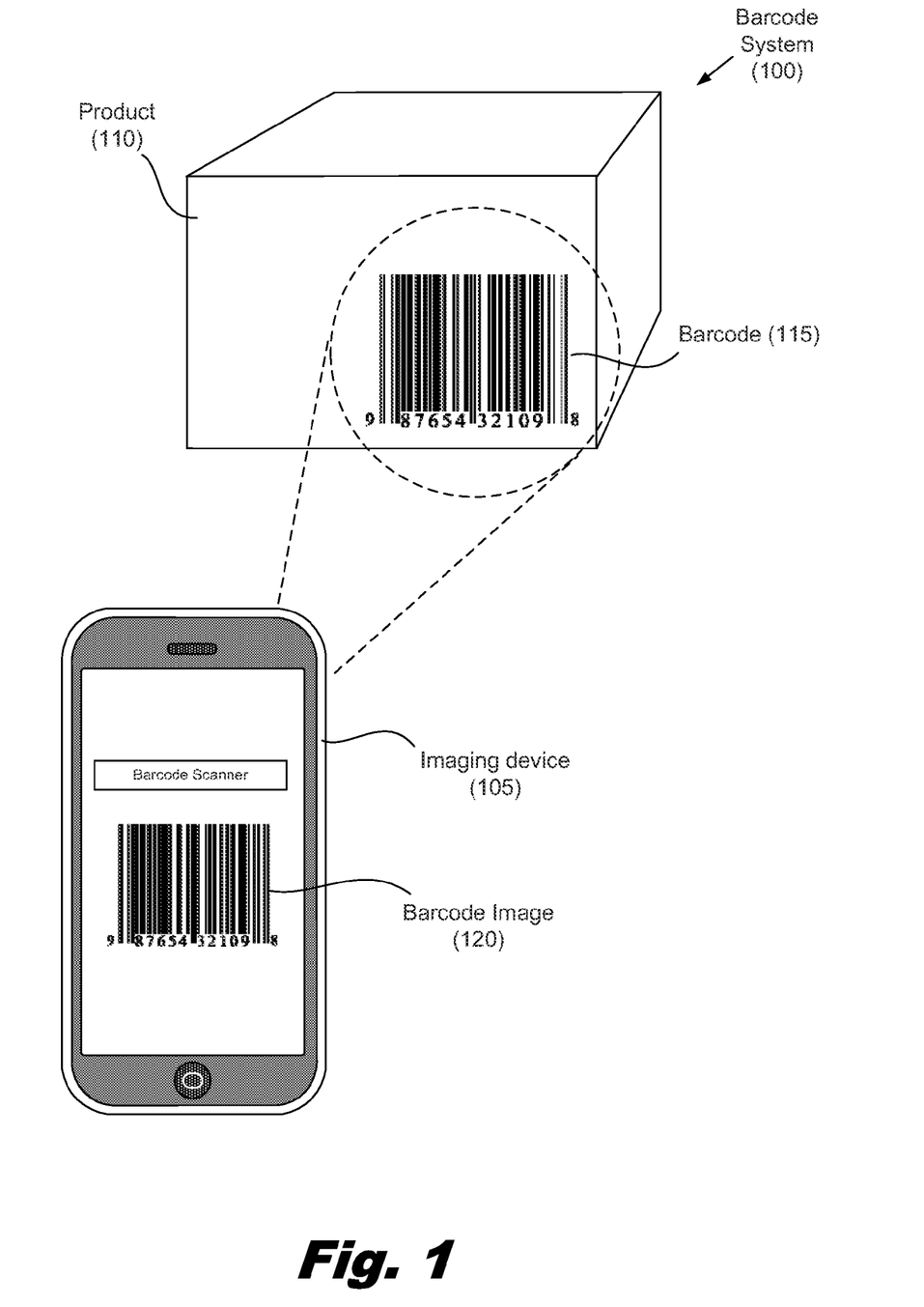
FIG. 1 is a diagram of an illustrative barcode scanning system, according to one embodiment of principles described herein.

FIG. 1 is a diagram of an illustrative barcode system (100) which includes an imaging device (105) which uses a color camera to produce an image (120) of a barcode (115) placed on a product (110). As discussed above, a barcode (115) is an optical machine-readable representation of data. Barcodes can be used for a wide variety of purposes including the identification of products, services, inventory tracking, or to provide other information. Typical barcodes are linear or two dimensional images which are printed on a contrasting background. In this example, the bar code is a linear or one dimensional barcode which is ubiquitous for identifying the product or service. In the past, dedicated barcode readers were used to scan and decode the barcodes to automatically enter a number, text, or alpha/numeric string. Typically this scan and decode process is reasonably fast and highly accurate. This data can be used to track the product or service, simplify a purchase transaction, and for inventory management. However, dedicated barcode readers represent an additional expense and can only be used for scanning barcodes.

As general purpose color cameras, particularly in mobile devices, become less expensive and more widely available, it can be both efficient and convenient to use these color cameras to image barcodes. By using a mobile device as a barcode scanner, the user does not have to purchase or manage additional barcode scanning equipment. The incremental cost of providing the mobile devices with software which analyzes imaged data to decode barcode images is low. Further, the mobile device can use its existing connectivity, memory storage, and processing capability to provide value added services. For example, a data decoded from a barcode by a mobile device may be transmitted via the mobile device's wireless or cellular connection to a remote server which hosts traceability or supply management software. Additionally, the mobile device may access and present data related to the scanned product to the user in real time. For example, the mobile device may return data related to the products contents and origin, product recalls or safety issues, expiration date, current amount of inventory available, competitor pricing, or other information.

However, the color imaging sensors in the general purpose cameras are not specifically adapted to barcode imaging. In general, barcodes are designed to be read by dedicated barcode scanners which scan or image the barcode under controlled lighting and imaging conditions. For example, a barcode scanner may illuminate a barcode with monochromatic red light and use a detector or detector array to sense the reflection of the red light off the barcode. In this situation, the detector can be tuned to maximize its sensitivity to the red light which illuminates the barcode and ignores other wavelengths of light. Additionally, the barcode is often in close proximity to the barcode scanner when it is read. This minimizes the variations in lighting conditions and imaging distance.

In contrast, a color imaging sensor is designed to take full color images in a variety of lighting situations and over a large range of distances. This can lead to wide variations in the size and image quality of a barcode image produced by mobile device. For example, a mobile device user may take an image of a barcode in poor lighting conditions, at varying distances, while the mobile device is moving, or when the focus of the camera is not targeting the barcode. These and other conditions can degrade the image quality and/or introduce noise into the image.

Figure 2:
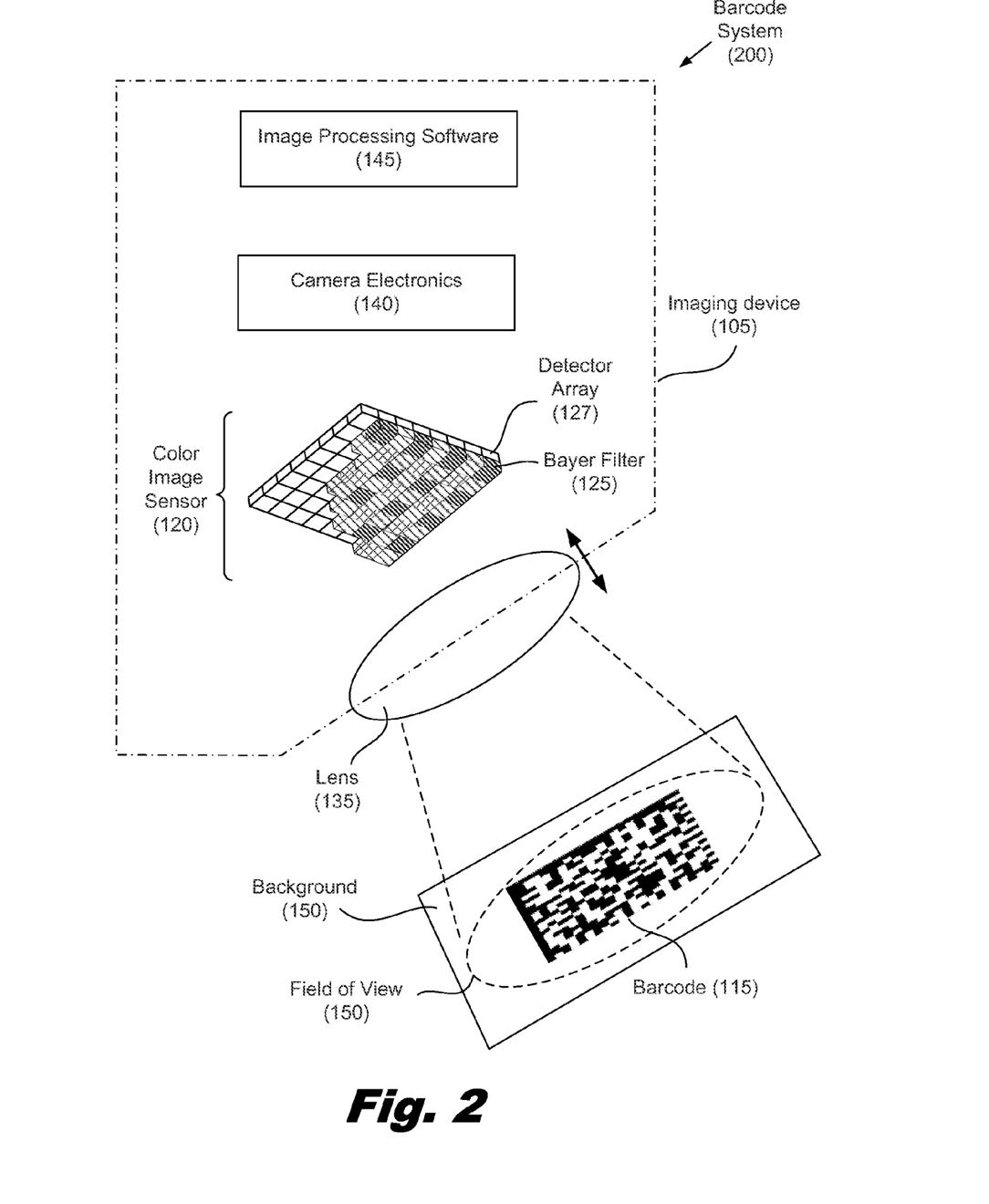
FIG. 2 is a diagram of an illustrative system of a barcode scanning system which includes a color image sensor, according to one embodiment of principles described herein.

FIG. 2 is a diagram which shows a barcode system (200). The barcode system includes a barcode (115) which imaged by a color image sensor (120) in an imaging device (105). In this example, the barcode (115) is a two dimensional barcode which is printed on a contrasting background (150). The colors of the barcode (115) and background (150) can be selected from a variety of combinations which produce sufficient contrast for the barcode to be detected against the background. For example, the barcode (115) may be printed black on white, blue on white, green on white, brown on white, black on yellow, blue on yellow, green on yellow, brown on yellow, black on red, blue on red, green on red, brown on red, or other combinations. Traditionally, barcodes are not printed in red ink because red ink is not detectable by a red scanner. For example, a red barcode printed on a white background would not be detectable by a red scanner because both the white background and the red barcode would reflect the incident red light in approximately equal amounts. However, when a color imaging camera is used to acquire the barcode image, this restriction is no longer necessary because other color channels present in the color image can be used to adequately detect the barcode. For example, a green channel of the color image could be used. The white background would reflect the incident green light and the red barcode would absorb the incident green light. This could provide sufficient contrast to detect the barcode.

In this example, the imaging device (105) includes a color camera made up of a focusable lens (135), a color image sensor (120), and camera electronics (140). The focusable lens (135) is used to adjust the focus of the camera. In this example, the color image sensor (120) includes a detector array (127) which is covered by a Bayer filter (125). The detector array (127) is typically manufactured using CMOS or CCD techniques and is made up of a two dimensional array of pixels. The detector array (127) by itself does not discriminate between colors, but produces an output which is a function of the sum of all light which is incident on the detector. To produce a color image, the detector array (127) is covered by an array of bandpass optical filters which allow only a specific portion of the incident light to pass through the filter to the detector. One example of an array of bandpass optical filters is a Bayer filter (125). In a Bayer filter (125), each pixel is filtered to record only one of three colors: red, blue or green. A regular pattern which alternates these red, blue, and green filters is placed over the detector. A variety of other optical filter configurations can be used. For example, Cyan, Yellow, Green and Magenta (CYGM) mosaic of pixel filters could be used or a Red, Green, Blue, Emerald (RGBE) pixel filter could be used. Additionally or alternatively, the CMOS image sensor may use an array of pixels which each consist of three vertically stacked photodiodes that are organized in a two-dimensional grid. Each of the three stacked photodiodes responds to different wavelengths of light. The signals from the three photodiodes are then processed, resulting in data that provides the three additive primary colors: red, green and blue. A variety of other technologies could also be utilized to create color image data.

To produce a full-color image, various demosaicing algorithms can be used interpolate a complete set of red, green, and blue values for each point. Typically, this demosaicing algorithm is implemented inside camera electronics (140). The camera electronics (140) may also provide various other functions such as detector calibration, read out functions, analog-to-digital conversion, and other functions. The image data is then passed from the camera electronics to the image processing software (145). The image processing software (145) may provide additional functionality, such as image analysis used to identify a barcode (115) from an image.

Figure 3:
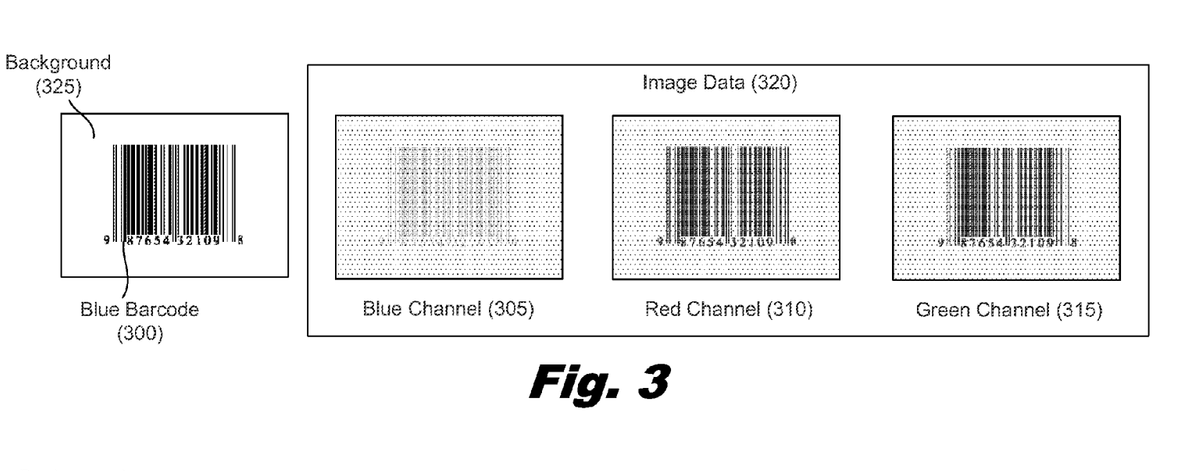
FIG. 3 is a diagram of an illustrative blue barcode and data derived from the blue barcode, according to one embodiment of principles described herein.

FIG. 3 shows a blue barcode (300) which is printed in blue ink on a white background (325). The left-most image shows the blue barcode (300) as photographed in white light to produce a set of image data (320). The three images to the right represent the image data (320) divided into three separate color channels: a blue channel (305), a red channel (310), and a green channel (315). In the blue channel (305), both the white background and the blue ink of the barcode reflect the blue light. Consequently, there is not significant contrast between the barcode and the background in the blue channel (305). In this example, the blue channel (305) may contribute more noise than useful information. The red channel (310) has significantly greater contrast between the background and the barcode because the white background reflects the red light and the blue ink absorbs the red light. Similarly the green channel (315) has good contrast between the background and the barcode because the white background reflects the green light and the blue ink absorbs the red light.

Additionally, each of the channels (305, 310, 315) may contribute noise to the overall image. For example, each of the channels may exhibit noise from quantum effects, dark current, thermal noise, electronic noise created by the analog-to-digital conversion of the detector signals, and other sources. These noise sources produce undesired random disturbances which mask the true information contained in the image. Noise sources can be particularly noticeable where the dynamic range of the true information is small. For example, noise can be noticeable in images taken in low light conditions.

To accurately and efficiently decode the barcode from the color image, it may be desirable to eliminate or reduce the weight of one or more of the color channels in the image. In the example shown in FIG. 3, the blue channel (305) does not contribute as much useful information about the barcode as the red and green channels (310, 315). However, the blue channel (305) may still contribute a significant amount of noise to the image. This noise degrades the information present in the red and green channels (310, 315) and can make the image more difficult to decode. Consequently, in this example it may be desirable to discard the blue channel (305) data and only work with the read and green channel (310, 315) data. This reduces the amount of data for the mobile device to process and also may reduce the overall noise level of the image.

In other embodiments, it may be desirable to reduce the weighting of the blue channel (305) rather than eliminate it entirely. For example, the data in the blue channel (305) could be weighted such that it contributed 10% of the overall magnitude of the image, while the red and green channels (310, 315) each contribute 45% to the overall magnitude of the image. The resulting combined image would be influenced less by the blue channel (305) than the red or green channels (310, 315).

According one illustrative embodiment, the weightings may be directly calculated from the differences in the color contrast between white background and the blue barcode. For example, the white background color may be {R, G, B}={191, 187, 152} and the blue bars may be {R, G, B}={5, 30, 69}. Subtracting the two colors to find a contrast results in {deltaR, deltaG, deltaB}={186, 157, 83}. This means that the greatest contrast is in the red channel and the least contrast is in the blue channel. One possible solution for weighting is to normalize the differences {deltaR, deltaG, deltaB}={186, 157, 83} which results in {44%, 37%, 19%). Thus, the transformed image would include the red channel weighted at 44%, the green channel weighted at 37% and blue channel weighted at 19%. This transformed image would have greater contrast and less noise than the original image. This technique can be applied barcodes and backgrounds of any color.

Figure 4:
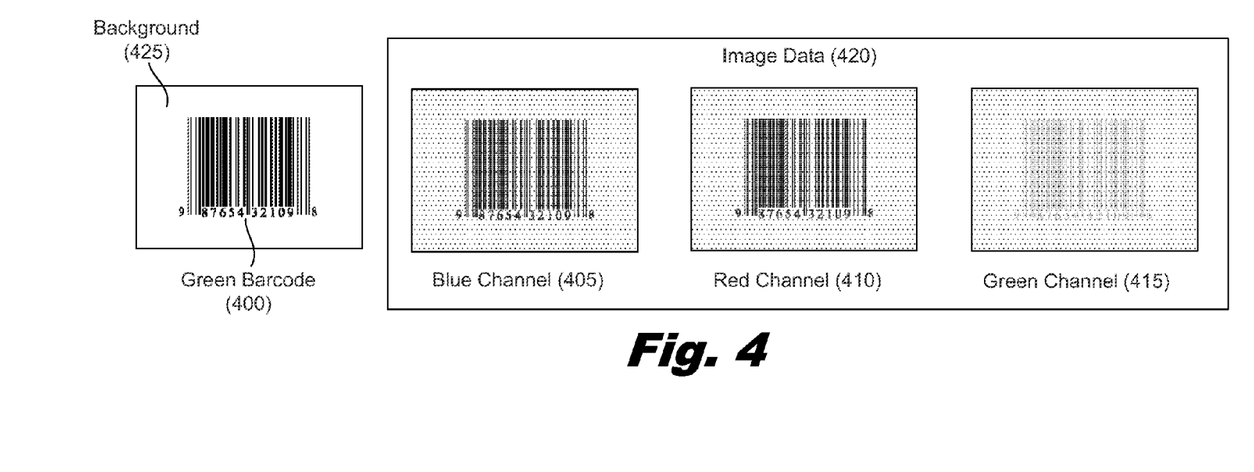
FIG. 4 is a diagram of an illustrative green barcode and data derived from the green barcode, according to one embodiment of principles described herein.

FIG. 4 shows a green barcode (400) which is printed in green ink on a white background (425). The left-most image shows the green barcode (400) as photographed in white light to produce a set of image data (420). Similar to the image data discussed in FIG. 3, one of the color channels has lower contrast than the other channels. In the example in FIG. 4, the barcode in the green channel (415) has lower contrast than the barcode in the blue and red channels (405, 410). This is because the green ink which makes up the green barcode (400) reflects green light while absorbing blue and red light. Consequently, there is not significant contrast between the barcode and the background in the green channel (415).

As discussed above, to accurately and efficiently decode the barcode (400) from the color image, it may be desirable to eliminate or reduce the weight of one or more of the color channels in the image. In the example shown in FIG. 4, the green channel (415) does not contribute as much useful information about the barcode as the blue and red channels (405, 410). Consequently, in this example it may be desirable to discard or reduce the weight the green channel (415) data.

Figure 5:
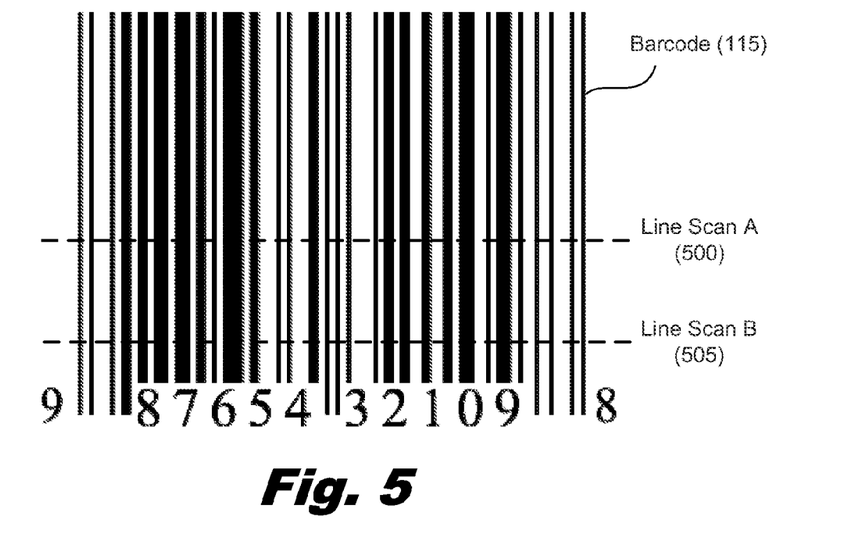
FIG. 5 is a diagram of illustrative line scans passing across a barcode, according to one embodiment of principles described herein.
Figure 6:
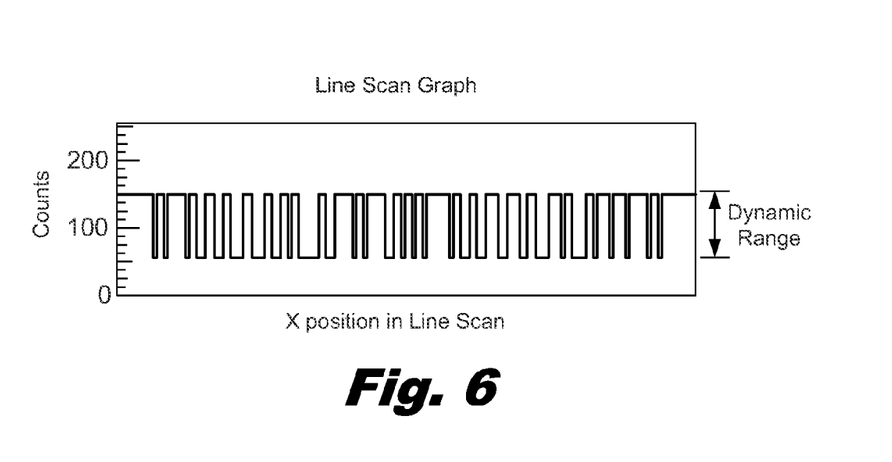
FIG. 6 is a graph of illustrative data generated by a line scan across a barcode, according to one embodiment of principles described herein.

FIGS. 5 and 6 show an illustrative method which can be used to determine which optical channel or channels should be discarded for a given image of a barcode. In FIG. 5, two scan lines (500, 505) cut across the barcode (115). For purposes of explanation, the barcode (115) has been presented as having high contrast with its background and is vertical on the page. In actual images, there may be significantly less contrast, skewed viewing angles, and noise.

The technique of analyzing a single row of pixels (a scan line) across an image can be quickly performed. The scan lines may be in any direction across the image. In this example, the scan lines (500, 505) conveniently intersect the vertical bars of the barcode (115) at a 90 degree angle. However, the barcode (115) may not always be in a vertical upright orientation in an image. Consequently, the scanning algorithm may cut across the image in vertical, horizontal or at diagonal angles to determine if a barcode is present in the image.

According to one illustrative embodiment, the scanning algorithm first separates the image into the various color channels. The algorithm then scans each of the color channels to determine if a barcode is present. FIG. 6 shows a scan line graph which plots the image intensity counts across scan line A (500, FIG. 5). In this example, there are a maximum of 256 counts, with low counts representing darker portions of the image and high counts representing brighter regions of the image. In FIG. 6, the darker portions of the image (the bars on the barcode) have a count of approximately 55, while the brighter areas of the image (the background between the bars) have a count of approximately 150.

The dynamic range of the image along the scan line can be calculated by subtracting the lower counts from the higher counts. This may be a single subtraction of the highest observed count from the lowest observed count along the scan line or may be a more complex calculation which uses averaging to minimize distortion of the calculation by noise. In this example, the dynamic range is approximately 100 counts. The dynamic range value can then be used to determine if there is significant data in a given channel. For example, a channel with a dynamic range of 150 would be expected to have greater information content and higher contrast than a channel with a dynamic range of 15. If the dynamic range for a given channel falls below a threshold, that color channel could be excluded from further analysis.

The dynamic range could also be used to discard entire images. For example, if all the scans exhibit low dynamic range values, the algorithm may determine that the image has poor quality and reject the image. The algorithm may then move on to receive a subsequent image from the camera which has better quality. For example, the first image may have been taken out of focus, in poor light, or from a significant distance from the barcode. However, a later image may have better characteristics and may be more quickly and accurately decoded.

Figure 7:
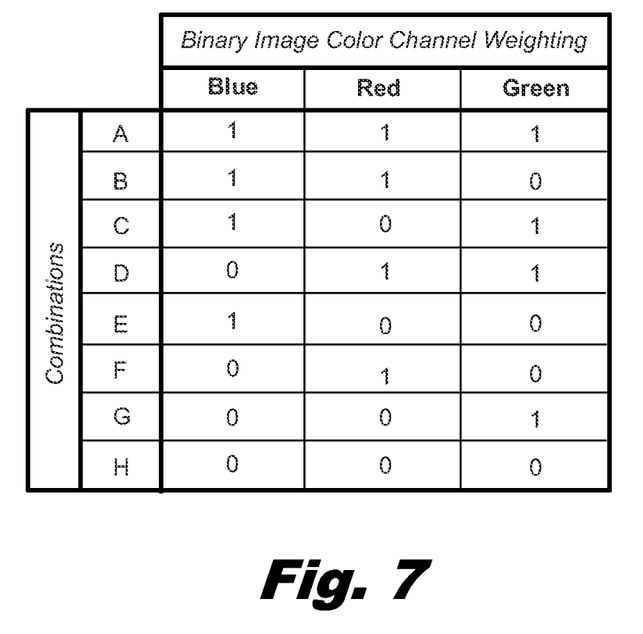
FIG. 7 is a chart of illustrative binary image color channel weights which could be used for noise removal from barcodes in color images, according to one embodiment of principles described herein.

FIG. 7 is an illustrative chart of various binary image color channel weightings which could be applied to an image. In this embodiment, the weightings are shown as either a "1" or a "0". A "1" corresponds to fully including a given channel in the subsequent calculations. A "0" corresponds to excluding a given channel from further consideration. As discussed above, a binary decision to include or exclude a given channel is not required. The weightings may have any value. However, for purposes of explanation, only a limited number binary of weightings are illustrated in FIG. 7.

The color channels (blue, red, and green) are shown in vertical columns. These color channels are only illustrative examples. A variety of other color schemes could be used. For example, a cyan/magenta/yellow or other color scheme could be used. The various combinations of the color channels are shown in eight rows in the chart. Each combination is labeled with a letter.

Each of the various combinations discussed below assumes that barcodes are printed on a white or reflective background. However, printing on a white or reflective background is not required. As discussed above, barcodes can be printed on a variety of colored background. Combination A has "1" weightings for all color channels. This combination may be most useful for black barcodes printed on white backgrounds. The black barcode absorbs a significant portion of light in each color channel and the white background reflects a significant portion of light within each color channel.

Combination B includes both blue and red channels but excludes the green channel. Consequently, combination B may be most useful in recognizing barcodes printed with green ink. Combination C includes both blue and green channels but excludes the red channel. Consequently, this combination may be most useful in reading barcodes printed in red ink. This combination may have limited usefulness because most barcodes are printed so that they can be read with red illumination. Thus, barcodes are not typically printed in red ink.

Combination D includes both the red and green channels but excludes the blue channel. This combination may be most useful in reading barcodes printed in blue ink. These blue barcodes are increasingly popular. Combination E includes the blue channel, but excludes both the red and green channels. This combination may be useful in reading green barcodes while processing a minimal amount of information.

Combination F includes only the red channel. This combination may be particularly useful because black, green, and blue barcodes have high contrast in the red channel of color images. Consequently, if a global combination for all images which requires minimal processing is desired, the combination F may be an attractive option. Combination G uses only the green channel and may be useful for decoding blue barcodes. Combination H is the trivial combination in which all data is discarded and is presented only by way of completeness.

Figure 8:
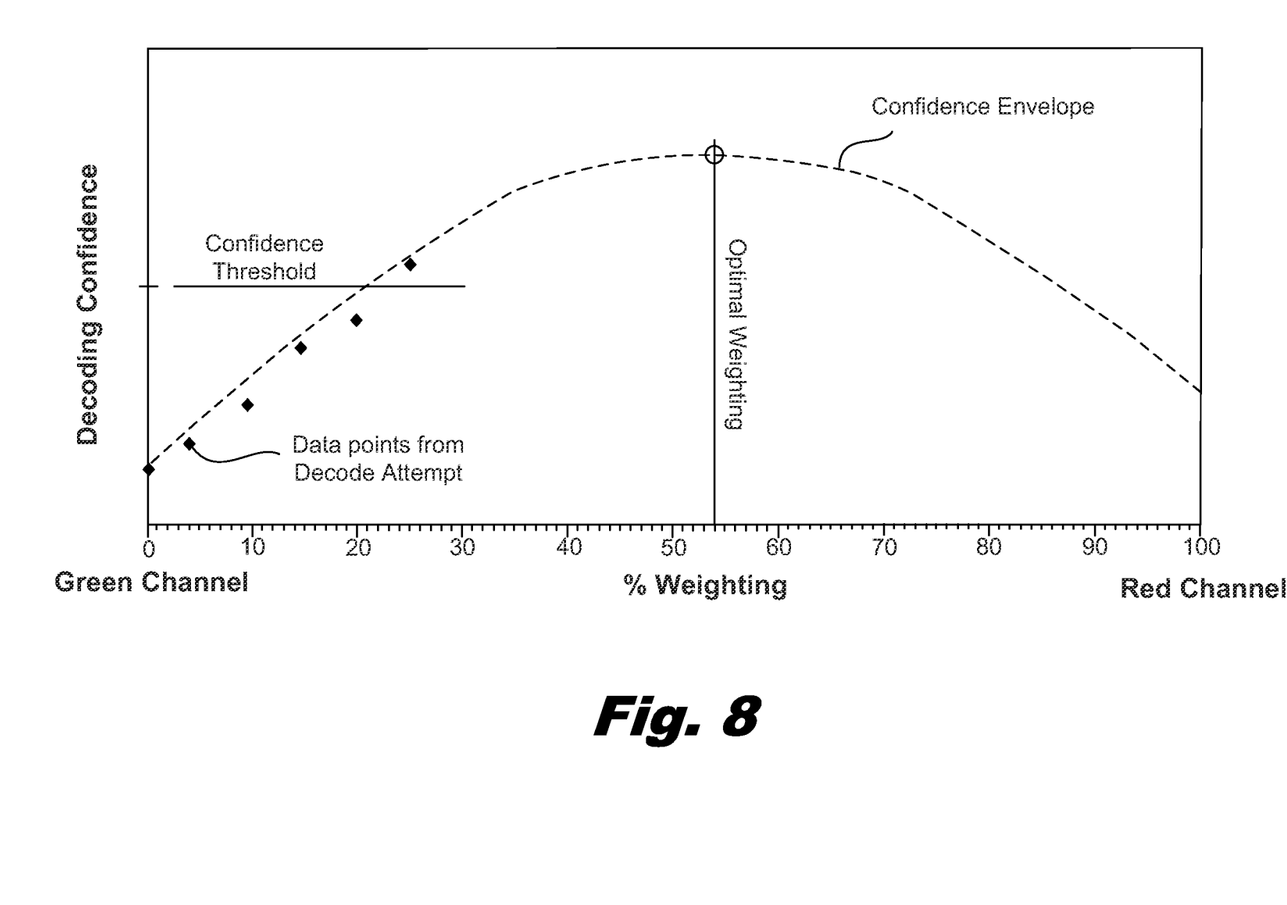
FIG. 8 is a graph showing results from an illustrative predictive decoding algorithm, according to one embodiment of principles described herein.

FIG. 8 is a chart which shows a method for predictive decoding of a barcode. The data presented in FIG. 8 is simulated data which can be used to illustrate one method for predictive decoding of a barcode. In this example, combination D from FIG. 7 has been selected as a starting point for the predictive algorithm. Combination D includes both the green and red channels but excludes the blue channel. Combination D may be particularly suited for decoding blue barcodes and may also be useful for reading black barcodes. However, weightings of the green and red channels may be changed to optimize the contrast and noise in the image.

In the example shown in FIG. 8, the decoding confidence is shown on the vertical axis of the graph and the weighting in percent is shown along the horizontal axis of the graph. The decoding confidence is a measure of the overall level assurance that a barcode has been successfully decoded. The decoding confidence may increase for high quality images or after a series of poorer images are decoded with matching results. At some point, the confidence in a decoded value exceeds a confidence threshold. The decoding then stops and the decoded information is used for further operations such as identifying a product or accessing a database.

The weighting in percent across the horizontal axis of the graph indicates the relative proportion of the green and red channels in the analyzed image. The numbers along the horizontal axis show the percentage of the red channel present in a transformed image. On the left end of the graph, the image is made up of 100% of the green channel and 0% of the red channel. On the right end of the horizontal axis, the image is made up of 0% of the green channel and 100% of the red channel.

In this example, the initial decoding attempt weighted the red channel at 0% and the green channel at 100%. This decoding attempt is the left most data point and did not result in a level of confidence sufficient to exceed the confidence threshold. Consequently, the algorithm adjusted the weightings to include approximately 5% of the red channel and only 95% of the green channel. Performing another decoding attempt resulted in an increased confidence level, but not sufficient to exceed the confidence threshold.

Because the adjustment of the weights to include more of the red channel information results a higher decoding confidence level, the algorithm predicts that an additional increase in the red channel information will result an even higher decoding confidence level. In subsequent decoding attempts, the algorithm shifts the weighting toward the red channel by approximately 5% for each new attempt. The confidence level continues to rise until, at a weighting of approximately 25% red channel and 75% green channel, the decoding confidence exceeds the confidence threshold and the decoding process stops.

The dashed line represents a confidence envelope. The global maximum of the confidence envelope represents the optimal weighting of the green and red channels for this particular image or series of images. However, as illustrated in FIG. 8, the barcode can be decoded to a given confidence threshold without using the optimal weighting. In this example, the optical weighting for the analyzed image is 54% of the red channel and 46% of the green channel.

FIG. 8 is only one illustrative example of predictive techniques for reducing noise from barcodes in color images. In another embodiment, the predictive technique could be extended between successive images. For example, if a certain combination of color channels was successful in an image having a given set of characteristics (bar code size, color histogram, lighting, etc.) it may be retrieved and applied to other images which have similar characteristics.

The techniques described above can result in significant gains in Signal-to-Noise Ratio (SNR) in the bar code image. Here the SNR is defined as:

$$SNR = \frac{\frac{barcodesignal - backgroundsignal}{numberofchannels}}{\frac{noisesignal}{numberofchannels}} \quad \text{Eq. 1}$$

Where:
barcodesignal=the sum of the barcode signals on all three color channels
backgroundsignal=the sum of the background signals on all three color channels
noisesignal=the square root of the sum of the squares of the noise on in all color channels.
numberofchannels=number of color channels present in the image Applying the equation above to the example given in FIG. 3, the white background of the barcode is made of color {R,G,B}={191, 187, 152} and the blue bars are made of {R,G,B}={5, 30, 69}. In this example, the imaging process adds noise on top of the signal which has a standard deviation (sigma)=30. This noise level is added to all color channels independently. If the image processing takes a straight average of all three channels, the signal is ((191+187+152)−(5+30+69))/3=142 and the noise is ((30^2+30^2+30^2)^0.5)/3=26.0. Thus, the SNR is 5.46 in this case. This is the unoptimized case which does not apply techniques described above for removal of noise from barcode images.

Using the binary weighting technique shown in FIG. 7, the blue channel can be discarded. This corresponds to combination D in FIG. 7. In this case, the signal is ((191+187)−(5+30))/2=171.5 and the noise is ((30^2+30^2)^0.5)/2=21.2. This results in a SNR of 8.08. This is an improvement in the signal to noise ratio of approximately 48% over the unoptimized case.

Another binary weighting combination can be used where two color channels are discarded. For example, combination F in FIG. 7 discards both the blue and green channels. In this case, the signal is (191-5)=186 and the noise is 30. This results in a SNR of 6.20, which is an improvement in the SNR of approximately 33% over the unoptimized case.

Using a variable weighting method similar to that described in FIG. 8, weightings of (44%, 37%, 19%) can be used for the red, green, and blue channels. The signal is then (44%*191+37%*187+19%*152)−(44%*5+37%*30+19%*69)=155.7 and the noise is (((44%*30)^2+(37%*30)^2+(19%*30)^2)^0.5)=18.2. The SNR is 8.55. This is an improvement in the signal to noise ratio of approximately 57% over the unoptimized case.

Figure 9:
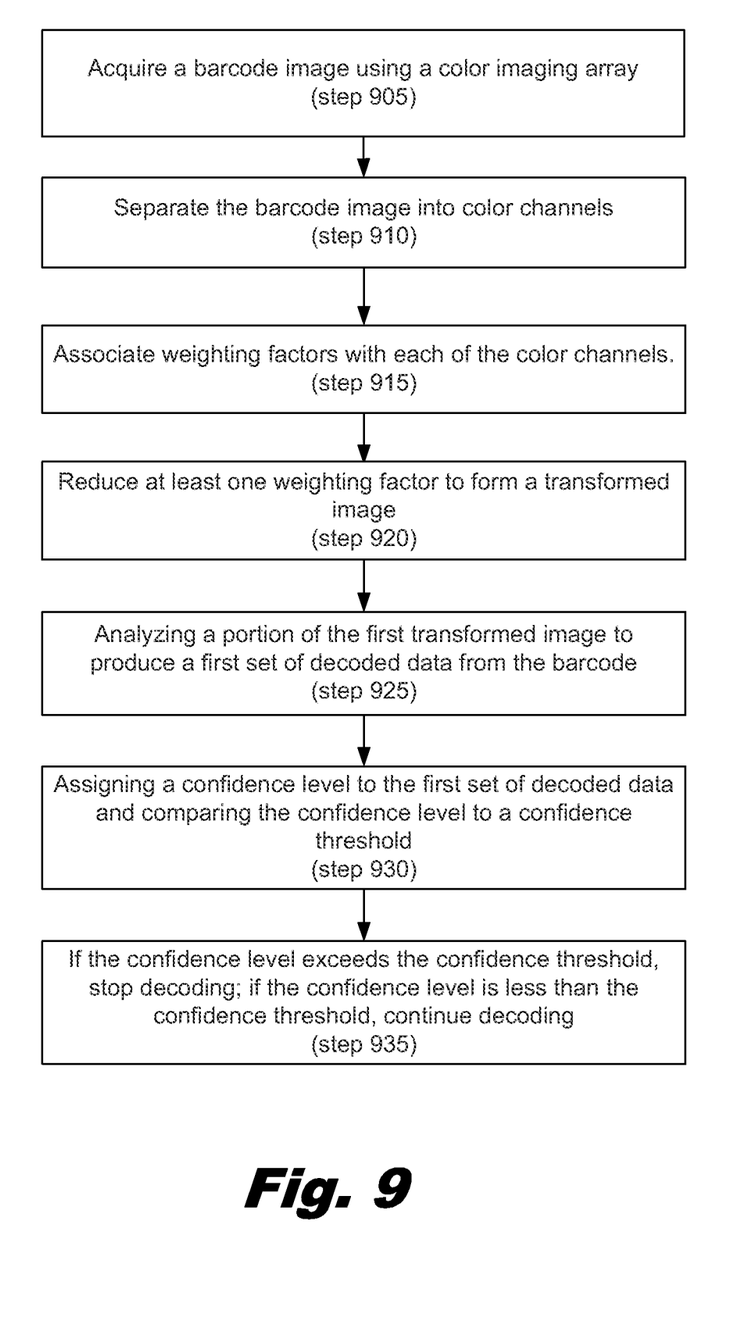
FIG. 9 is a flow chart of an illustrative method for noise removal from barcodes in color images, according to one embodiment of principles described herein.

FIG. 9 is a flow chart of an illustrative method for noise removal from barcodes in color images. In a first step, a barcode image is acquired from a color imaging array (step 905). According to one illustrative embodiment, the color imaging array is contained within a general purpose camera in a mobile device which is configured to access a cellular network. The general purpose camera acquires the barcode image without external optical filters and without narrow band optical illumination.

The barcode image is separated into color channels (step 910). In some embodiments, the barcode image may be communicated from the color imaging array in separate channels. In other embodiments, the barcode image may be communicated from the color imaging array in a combined format which interpolates color pixels to produce full color points across the image. For example, the combined format may be a RAW format, JPEG format, or a TIFF format. When the barcode image is communicated to the image processing software in a combined format, the image processing software separates the combined image into color channels. As discussed above, the color channels can be separated into a variety of color formats, including red/green/blue (RGB) format and cyan/yellow/magenta (CYM) formats.

Weighting factors are associated with each of the color channels (step 915). Initially, the weighting factors may all be assigned to "1" or other uniform maximum value to represent the initial contribution of the color channels to the overall barcode image. In some other cases, the weighting factors may be assigned values which reflect the relative magnitudes of the contributions of the individual color channels to the barcode image. For example, if a barcode image was acquired in environmental lighting which is skewed toward blue light, the blue channel may have a greater magnitude in the barcode than other channels. In some embodiments, the blue channel could be assigned an initial weighting value which is greater than other weighting values.

At least one of the weighting factors is reduced to produce a transformed image (step (920). The pixel magnitudes of the color channel associated with the reduced weighting factor are multiplied by the reduced weighting factor. The color channel can then be combined with the other color channel. In some embodiments, the weighting factors are binary and reducing a weighting factor results in the weighting factor being changed from "1" to "0". In these embodiments, the color channel associated with the reduced weighting factor is eliminated from the transformed image. In other embodiments, the proportional influence of the color channel is simply reduced in the transformed image. In some embodiments, where a global solution with minimal processing requirements is desired, all channels except a channel containing a red light component can be discarded.

A variety of methods can be used in selecting which channel should have a reduced weighting factor. In one embodiment, a dynamic range of a portion of pixels within the barcode image can be calculated. For example, a line scan technique can be used. In a line scan, a dynamic range is calculated by analyzing image intensities within a color channel along a line of pixels in the image. Color channels which have lower dynamic ranges may not have high contrast between the barcode and the background. Consequently, these color channels may still contribute significant noise to the barcode image but not contribute as much decoding information. The influence of color channels which have lower dynamic ranges may be reduced or eliminated by applying a reduced weighting factor. The dynamic ranges of color channels may be compared to a dynamic range threshold or to other channels in the image. In some embodiments, if all of the color channels fail to meet a dynamic range threshold, the entire image may be discarded. A new barcode image is then acquired and the process is started again. This prevents the mobile device from wasting capacity and time on images which have a low probability of producing decoded information.

Another method of selecting which channel should have a reduced weighting factor is to use one or more predictive algorithms. As discussed above with respect to FIG. 8, the predictive algorithm may include performing an initial weighting and analysis of the barcode image and then adapting the weighting factors to produce altered weighting factors. These altered weighting factors are applied to the color channels to produce a second transformed image which is analyzed to produce a second set of decoded data. A second level of confidence is assigned to the second set of decoded data. If the second set of decoded data has a higher level of confidence than first set of decoded data, then the weighting factors are further adapted based on a trend established by the weighting factors which produced the first transformed image and the second transformed image.

Other predictive algorithms may include storing weightings which were successfully used in past barcode images. These weightings can then be retrieved and used as initial starting points for evaluating a current image. In some embodiments, camera settings of the successfully decoded image or characteristics of the successfully decoded image could be saved with the weightings. By comparing this additional data with the camera settings or image characteristics of the current image, a more effective stored weighting may be selected.

After the weightings are applied to the color channels, the color channels can be combined to form a transformed image. There are a variety of methods by which the color channels can be combined. For example, the relative weighted magnitudes of color channels can be summed to produce a grayscale transformed image. In another example, the weighted magnitudes of the color channels can be compared to threshold levels to produce a black and white image.

The transformed image is then analyzed to produce a first set of decoded data from the barcode (step 925). This analyzing process can take a variety of forms. By way of example and not limitation, a line scanning technique can be used. As discussed above, line scanning involves analyzing image intensities along a line of pixels in the image. One or more line scans may be performed across the image. For example, 15 sequential line scans may be performed across the barcode image. Each line scan may decode none, all, or a portion of the information contained in the barcode. The decoding results of the one or more line scans may be accumulated into a first set of decoded data. A variety of other techniques may be used for decoding a barcode image and generating the first set of decoded data.

A confidence level is assigned to the first set of decoded data and the confidence level is compared to a threshold (step 930). The confidence level may be calculated in a variety of ways. For example, if 15 line scans were performed on the barcode image, 9 of the line scans may have produced at least one digit of information and three of the line scans produced complete decoding of the barcode. If all of the line scans agree with a single interpretation of the barcode information, the confidence level in the first set of decoded data may be high. However, if there are significant disparities between information produced by the various line scans, the confidence level may be low.

The confidence level is then compared to a threshold confidence level to determine if the barcode has been decoded well enough stop the decoding process (step 935). For example, the threshold confidence level may be set a 90%, 99%, or 99.9% confidence interval. If the assigned confidence level in the first set of decoded data meets or exceeds the threshold confidence level, the decoding process terminates. The decoded data may then be used to identify the product and/or access a database to retrieve or write information regarding the product. When the confidence level is low, the decoding process continues by rebalancing weighting factors of color channels and analyzing the transformed image. Additionally or alternatively, new barcode images may be acquired and analyzed. For example, the camera may generate a data stream which includes a large number of low resolution frames (i.e. a video stream of 30-60 frames per second). These frames may be successively analyzed until the decoding confidence exceeds the threshold confidence level.

In sum, noise removal from color barcode images can be accomplished by using a color imaging camera to take an image of a barcode and using image processing software to reduce the contribution of at least one color channel in the barcode image to form a transformed barcode image. The color channel which has a reduced contribution to the transformed barcode image will typically have lower contrast between a background and a barcode than other color channels in the barcode image but contribute a significant portion of noise. By reducing this color channel, the noise in the transformed image is reduced, thereby allowing the barcode image to be more accurately decoded.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for noise removal from color barcode images comprises:
   acquiring a barcode image using a color imaging array;
   separating the barcode image into color channels;
   associating weighting factors with the color channels;
   reducing at least one weighting factor;
   applying the weighting factors to the color channels to produce a first transformed image;
   analyzing a portion of the first transformed image to produce a first set of decoded data from the barcode;
   using the decoded data to access a remote database;
   retrieving data related a product to which the barcode is affixed from the remote database; and
   displaying the retrieved data.

2. The method of claim 1, in which reducing at least one weighting factor comprises discarding at least one color channel.

3. The method of claim 1, in which reducing at east one weighting factor comprises discarding all color channels except a red color channel.

4. The method of claim 1, in which producing a first transformed image comprises summing the magnitude of two or more channels to produce a grey scale image.

5. The method of claim 1, in which producing a first transformed image comprises applying threshold levels to color intensities of at least one channel to create a black and white image.

6. The method of claim 1, further comprising assigning a confidence level to the first set of decoded data and comparing the confidence level to a confidence threshold.

7. The method of claim 1, further comprising:
   adapting the weighting factors to produce altered weighting factors;
   applying the altered weighting factors to the color channels to produce a second transformed image;
   analyzing the second transformed image to produce a second set of decoded data;
   assigning a second level of confidence to the second set of decoded data; and
   if the second set of decoded data has a higher level of confidence than first set of decoded data, then continuing to adapt a composition of the second transformed image based on a trend established by the weighting factors which produced the first transformed image and the second transformed image.

8. The method of claim 1, further comprising calculating a dynamic range of at least portion of pixels within the barcode image for each color channel.

9. The method of claim 8, further comprising discarding at least one color channel which has a dynamic range is lower than other channels.

10. The method of claim 8, further comprising discarding the barcode image if the dynamic range of a plurality of color channels does not meet a dynamic range threshold level.

11. The method of claim 1, further comprising basing weighting factors of color channels in a current image based on color channel weighting factors which were successfully used in past images.

12. The method of claim 10, further comprising selecting weighting factors of color channels based on weighting actors which were successfully used in past images with characteristics which are similar characteristics of the current image.

13. The method of claim 1, further comprising performing a line scan a barcode image by analyzing image intensities along a line of pixels in the image.

14. The method of claim 13, in which a confidence level is calculated based on cumulative line scans across at least one of: a single barcode image and multiple barcode images; the line scans continuing to be performed until the confidence level exceeds a threshold.

15. The method of claim 1, in which the weighting factors are predicatively adapted based on trends in confidence levels of successive decode attempts.

16. The method of claim 1, in which the color imaging array is contained within a general purpose camera in a mobile device configured to access a cellular network, the general purpose camera acquiring the barcode image without external optical filters and without narrow band optical illumination.

17. The method of claim 1, in which the weighting factors are at least partially based on camera settings at a time the barcode image is taken.

18. A system for noise removal in barcode images comprising:
   a color imaging camera comprising a color imaging array, in which the color imaging array is contained within a general purpose camera in a mobile device configured to access a cellular network, the general purpose camera acquiring the barcode image without external optical filters and without narrow band optical illumination; and
   imaging processing software, the image processing software acquiring a barcode image from the color imaging array and reducing the contribution of at least one color channel in the barcode image to form a transformed barcode image; the at least one color channel having lower contrast between a background and a barcode than other color channels in the barcode image.

19. A computer program product for noise removal from color barcode images, the computer program product comprising:
   a non-transient computer readable storage medium having computer readable program code embodied therewith, the computer readable program code comprising:
   computer readable program code configured to acquire a barcode image using a color imaging array;
   computer readable program code configured to separate the barcode image into color channels;
   computer readable program code configured to calculate a dynamic range of at least portion of pixels within the barcode image for each color channel;
   computer readable program code configured to associate weighting factors with the color channels;
   computer readable program code configured to reduce at least one weighting factor;
   computer readable program code configured to apply the weighting factors to the color channels to produce a first transformed image; and
   computer readable program code configured to analyze a portion of the transformed image to produce a first set of decoded data from the barcode.

20. The computer program product of claim 19, further comprising:
   computer readable program code configured to use the first set of decoded data to access a remote database;
   computer readable program code configured to retrieve data related a product to which the barcode is affixed from the remote database; and
   computer readable program code configured to display the retrieved data.

* * * * *